(No Model.)

F. BAUMANN.
PIPE COUPLING.

No. 272,191. Patented Feb. 13, 1883.

Witnesses:
Frank S. Blanchard
Chas. J. Gooch

Inventor:
Frederick Baumann
By Wm H Lotz
Attorney.

UNITED STATES PATENT OFFICE.

FREDERICK BAUMANN, OF CHICAGO, ILLINOIS.

PIPE-COUPLING.

SPECIFICATION forming part of Letters Patent No. 272,191, dated February 13, 1883.

Application filed November 4, 1882. (No model.)

*To all whom it may concern:*

Be it known that I, FREDERICK BAUMANN, of Chicago, in the county of Cook and State of Illinois, have invented certain new and useful Improvements in Pipe-Couplings; and I do hereby declare that the following is a full, clear, and exact description thereof, reference being had to the accompanying drawings, and to the letters of reference marked thereon, which form a part of this specification.

This invention relates to certain improvements in couplings for sewer-pipes, as will be hereinafter described and claimed, the object of the invention being to produce a coupling whereby the cement-joint may be completely protected from being chipped or knocked away and be securely held against and evenly over the pipe-joint.

Figure 1:
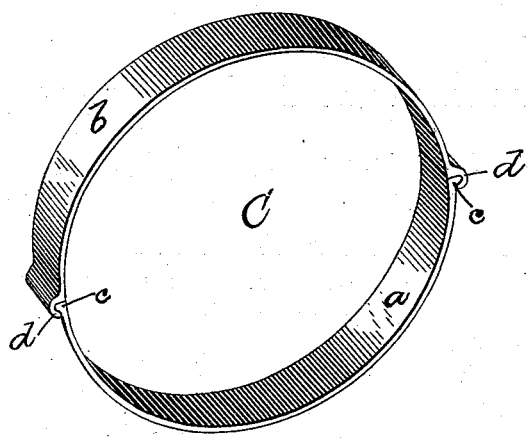
Figure 2:
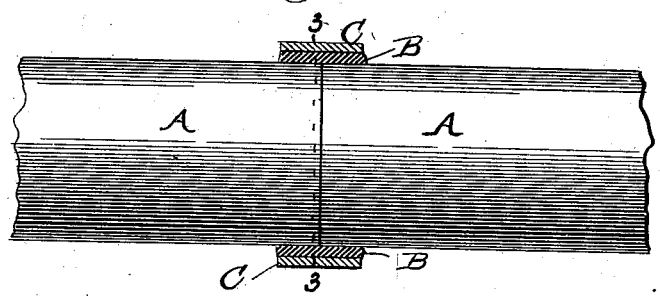
Figure 3:
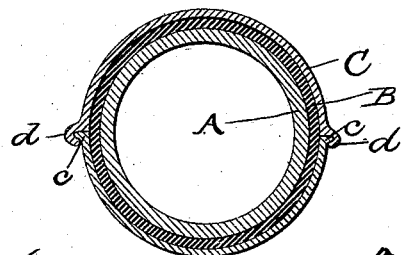

In the drawings, Figure 1 represents in perspective my improved coupling-ring. Fig. 2 represents a part of two sections of sewer-pipe with the adjacent ends cemented together and having my coupling-ring thereon. Fig. 3 is a vertical section of Fig. 2 on the line 3 3.

A represents a sewer-pipe section of usual construction.

B represents a layer of cement for joining the ends of the pipe-sections together in the customary manner.

C represents my improved coupling-ring, which is formed of two parts, *a b*, as shown, the one part, *a*, having an outwardly-projecting lug or flange, *c*, formed at each end, while the part *b* has, at each end, a hook or hook-shaped rim or flange, *d*. This ring C may be formed of cast metal of any desired quality; but it is found that they may be formed of ordinary cast-iron, and are thus produced very cheaply, and answer every purpose desired.

In coupling sections of sewer-pipes according to my improvements, I first place the part *a* of the ring against the under side of the sections to be secured, and either fill the space intervening between the pipe and the ring with cement B, or else previously apply such cement to and spread it around the face of either the pipe or the ring section. It will be understood that the ring-section is made broad enough to extend the requisite distance across and beyond the point of juncture of the pipe-sections, so that adequate support shall be afforded the joint to hold it securely. After the part or section *a* of the ring C has been secured in position cement is then applied either to the surface of the pipe-sections at the point which the ring is to embrace or it may be spread across the face of the ring-section *b* itself in the manner hereinbefore mentioned. The ring-section *b* is then slid along one of the pipe-sections until it reaches the section *a* of the ring, when the hook or flange *d* is forced along and over the lug or flange *c* into the position shown in Figs. 1 and 2, when the two sections will be securely held together by the combined action of the cement and the hooking together of the ring-sections.

What I claim as new is—

A pipe-coupling consisting of ring C, having separable sections *a b*, provided with flanges *c d*, adapted to engage together, substantially as and for the purpose set forth.

In testimony that I claim the foregoing as my invention I affix my signature in presence of two witnesses.

FREDERICK BAUMANN.

Witnesses:
 LOUIS NOLTING,
 HARRIS W. HUEHL.